United States Patent
Izumo et al.

(10) Patent No.: US 9,752,923 B2
(45) Date of Patent: Sep. 5, 2017

(54) DATA LOGGER FOR MEASUREMENT DEVICE

(75) Inventors: Naoto Izumo, Kitamoto (JP); Takaaki Kagawa, Kitamoto (JP); Akiyoshi Ota, Kitamoto (JP)

(73) Assignee: A&D COMPANY, LIMITED, Tokyo (JP)

( * ) Notice: Subject to any disclaimer, the term of this patent is extended or adjusted under 35 U.S.C. 154(b) by 598 days.

(21) Appl. No.: 14/353,586

(22) PCT Filed: Nov. 4, 2011

(86) PCT No.: PCT/JP2011/075447
§ 371 (c)(1),
(2), (4) Date: Apr. 23, 2014

(87) PCT Pub. No.: WO2013/065174
PCT Pub. Date: May 10, 2013

(65) Prior Publication Data
US 2014/0297229 A1 Oct. 2, 2014

(51) Int. Cl.
*G01D 1/00* (2006.01)
*G01G 23/42* (2006.01)
(Continued)

(52) U.S. Cl.
CPC .............. *G01G 23/42* (2013.01); *G01D 9/00* (2013.01); *G01G 23/00* (2013.01); *G01G 23/48* (2013.01); *G01D 9/005* (2013.01); *G01G 23/37* (2013.01)

(58) Field of Classification Search
CPC ................................. G01D 9/00; G01D 9/005
(Continued)

(56) References Cited

U.S. PATENT DOCUMENTS

| 6,088,514 A * | 7/2000 | Foreman | G01D 9/005 |
| | | | 700/5 |
| 2009/0063069 A1* | 3/2009 | Wu | G01D 9/005 |
| | | | 702/65 |
| 2011/0170249 A1* | 7/2011 | Nunes | G01D 9/005 |
| | | | 361/679.01 |

FOREIGN PATENT DOCUMENTS

| JP | 63-145922 | 6/1988 |
| JP | 2008-064693 | 3/2008 |

(Continued)

OTHER PUBLICATIONS

English translation of JP 2011-008572, Jan. 13, 2011.*

*Primary Examiner* — Michael Nghiem
(74) *Attorney, Agent, or Firm* — Roberts Mlotkowski Safran Cole & Calderon P.C.

(57) ABSTRACT

For easy centralized management of measurement data and installation environmental data and user's real-time recognition through a certain type of peripheral equipment of how the installation environment affects the measured values at the site of measurement, a data logger for a measurement device includes in its structure any of the sensors for temperature, humidity, air pressure, and acceleration as an environmental sensor that detects a physical quality of an environment where the measurement device is installed, a data recording unit that records installation environmental data detected by the environmental sensor and measurement data detected by the measurement device on the basis of time, and a data processing unit that displays the installation environmental data and measurement data in whole or selectively, as numerical values or graphs of changes over time, with the time axes aligned, and includes one or more external equipment terminal connectors that exchange signals with external equipment.

3 Claims, 12 Drawing Sheets

(51) Int. Cl.
*G01D 9/00* (2006.01)
*G01G 23/00* (2006.01)
*G01G 23/48* (2006.01)
*G01G 23/37* (2006.01)

(58) Field of Classification Search
USPC .................................................. 702/127, 189
See application file for complete search history.

(56) References Cited

FOREIGN PATENT DOCUMENTS

| | | |
|---|---|---|
| JP | 2009-257927 | 11/2009 |
| JP | 2011-008572 | 1/2011 |
| JP | 2011-012994 A | 1/2011 |

\* cited by examiner

DATA LOGGER FOR MEASUREMENT DEVICE

TECHNICAL FIELD

The present invention relates to a data logger for a measurement device such as an electronic balance, and particularly, to a data logger for a measurement device that manages measured values and installation environmental data of the measurement device.

BACKGROUND ART

Conventionally, in laboratories and production sites where measurement devices such as electronic balances are used, monitoring (recording over time) of installation environmental conditions (temperature, humidity, air pressure, etc.) that affect the performance of the measurement devices in parallel with measured values has been commonly performed. In this case, due to the demand for freedom of data processing in data analysis, data loggers capable of digitally recording measurement data and installation environmental data have been often used. For example, as regards the measurement data, a digital measurement data logger that receives measurement data from a measurement device, digitally records numerical values, and enables output of the same to a personal computer (hereinafter, a PC) via a USB terminal (Patent Literature 1) has been provided, and as regards the installation environmental data, a digital environmental data logger capable of receiving environmental data from respective environmental measuring instruments, digitally recording numerical values, and displaying such environmental data on its own display section (Patent Literature 2) etc., has been provided.

CITATION LIST

Patent Literature

Patent Literature 1: Japanese Published Unexamined Patent Application No. 2011-8572 (paragraphs 0027 to 0028, FIG. 1, etc.)
Patent Literature 2: Japanese Published Unexamined Patent Application No. 2009-257927 (paragraphs 0002 and 0008, FIG. 1, etc.)

SUMMARY OF INVENTION

Technical Problem

However, at the site of measurement, there has been a problem of how to manage in a centralized manner installation environmental data and measurement data recorded in different instruments in order to link acquired installation environmental data and measurement data to be graphed and numerically process the data.

In contrast thereto, because only measurement data is acquired from the data logger of Patent Literature 1 described above and installation environmental data is merely acquired from the data logger of Patent Literature 2 described above, centralized management of these data causes a difficulty of transferring both data to other equipment. Moreover, use of a PC as a recording medium allows easy centralized management of measurement data and installation environmental data, but causes trouble such as securing a space to dispose a PC around the measurement device or environmental measuring instrument and installing dedicated software. Moreover, it is first of all wasteful to occupy a PC for this purpose, and realization of centralized management has involved many inconveniences, such that PCs cannot be brought into a clean room or the like, and bringing in general-purpose recording media such as USB memories is also prohibited for reasons of security.

The present invention has been made in view of the problems of the conventional techniques mentioned above, and an object thereof is to provide a data logger exclusively for a measurement device capable of easily managing measurement data and installation environmental data in a centralized manner, and further provide a data logger for a measurement device that allows a user to recognize through a certain type of peripheral equipment how the installation environment affects the measured values in real time at the site of measurement.

Solution to Problem

In order to achieve the above-mentioned object, a data logger for a measurement device according to a first aspect of the invention is to be used for a measurement device that measures a mass of a measuring object, includes in its own structure any of the sensors for temperature, humidity, air pressure, and acceleration as an environmental sensor that detects a physical quality of an environment where the measurement device is installed, data recording means that records installation environmental data detected by the environmental sensor and measurement data detected by the measurement device on the basis of time, and data processing means that displays the recorded installation environmental data and measurement data in whole or selectively, as numerical values or graphs of changes over time, with time axes aligned, and includes one or more external equipment terminal connectors that exchange signals with external equipment such as the measurement device.

A second aspect of the invention is the data logger for a measurement device according to the first aspect of the invention, in which a humidity sensor and a temperature sensor among the environmental sensors are configured as a temperature/humidity sensor unit arranged so as to be attachable to and detachable from the data logger main body incorporating another environmental sensor, the data recording means, and the data processing means, and the temperature/humidity sensor unit includes a temperature/humidity data output terminal to transmit data to the data logger main body.

A third aspect of the invention is the data logger for a measurement device according to the second aspect of the invention, in which by connecting the temperature/humidity data output terminal to a temperature/humidity terminal connector of the data logger main body, the temperature/humidity data output terminal is made airtight and the temperature/humidity sensor unit is integrated in external appearance with the data logger main body.

A fourth aspect of the invention is the data logger for a measurement device according to the second or third aspect of the invention, in which a case of the temperature/humidity sensor unit is formed into a waterproof and dustproof structure that completely seals the temperature/humidity sensor with a filter made of a waterproof and moisture-permeable material being disposed over a position to dispose the humidity sensor and the waterproof and moisture-permeable filter being exposed to external ambient air, and a case of the data logger main body is formed into a waterproof and dustproof structure that completely seals the other environmental sensor, the data recording means, and the data processing means, and at the external equipment terminal connector, and a watertight cap to seal the connector part is attached.

Advantageous Effects of Invention

Based on the above, according to the first aspect of the invention, by providing an exclusive product capable of monitoring (recording over time) measurement data from the measurement device while also simultaneously monitoring environmental data of the temperature, humidity, air pressure, and vibration that affect measurement results, and managing both of the installation environmental data and measurement data in a centralized manner and then linking the installation environment and measurement data to be numerically displayed or graphed inside the single equipment, the difficulties regarding data processing associated with an environmental improvement for data acquisition, centralized data management, and data processing (numerical display, graphing) are eliminated.

Moreover, because of an exclusive product that is free to be carried around, no PC is required, so that trouble for a user at the site of measurement where data acquisition, centralized data management, and data processing have conventionally been difficult can also be eliminated.

Moreover, because data processing (numerical display, graphing) is possible in real time at the site of measurement and it is also further possible to pick up and selectively display only data desired by a user, environmental changes and a correlation between the environmental changes and measurement data are visually disclosed to the user, which allows the user to grasp that poor performance of the device is due to a change in the environment promptly and easily during measurement. Consequently, the reliability of the measurement device from the user is increased, and a guide for the user to improve the installation environment by him/herself can be provided.

According to the second aspect of the invention, as a result of configuring a humidity sensor that is a sensor particularly poor in durability as compared with other sensors as an attachable and detachable separate unit without incorporating into the data logger main body, among a wide variety of environmental sensors, because of the principle of measurement using changes in electrical conductivity with water absorption, because it suffices to replace only the temperature/humidity sensor unit in the case of a malfunction of the humidity sensor, maintenance of the data logger can be performed easily and at low cost.

Moreover, as a result of providing a temperature/humidity sensor unit into which a temperature sensor is also unitized, the temperature/humidity sensor unit can measure a temperature and humidity environment in another area separated from the data logger main body, and therefore can also be used as a temperature/humidity observing instrument of a device different from the logger concerned.

According to the third aspect of the invention, because the temperature/humidity sensor unit is not arranged to be externally attached to the data logger main body, but is housed so as to be integrated in external appearance with the data logger main body, the temperature/humidity sensor unit does not easily contact a person or object and physical damage is less likely to occur because of being covered with the data logger main body case. Moreover, the temperature/humidity sensor unit is less likely to be splashed with water drops and a malfunction due to liquid entry is also less likely to occur because of the covering.

According to the fourth aspect of the invention, because environmental measuring instruments are often used around water, conventionally, an environmental data logger having a waterproof and dustproof structure has existed. However, because it is necessary for the environmental data logger including a humidity sensor that the humidity sensor has a structure to allow water absorption of its humidity sensing body, the environmental data logger has a structure in which only the humidity sensor is in direct contact with external ambient air, and thus has not been a waterproof and dustproof structure. Therefore, by disposing a filter made of a waterproof and moisture-permeable material at the part that needs to permeate ambient air in the temperature/humidity sensor unit case, that is, the position for the humidity sensor so that only the filter made of a waterproof and moisture-permeable material contacts ambient air and the temperature sensor and humidity sensor are completely sealed by the case, a dustproof and waterproof structure can be provided despite inclusion of a humidity sensor.

On the other hand, also for the data logger main body, because a watertight cap is attached to its external equipment connector and the body case is constructed as a sealed structure, dust or liquid never enters the case in a state other than where the data logger main body is connected with external equipment.

DESCRIPTION OF EMBODIMENTS

Figure 1:
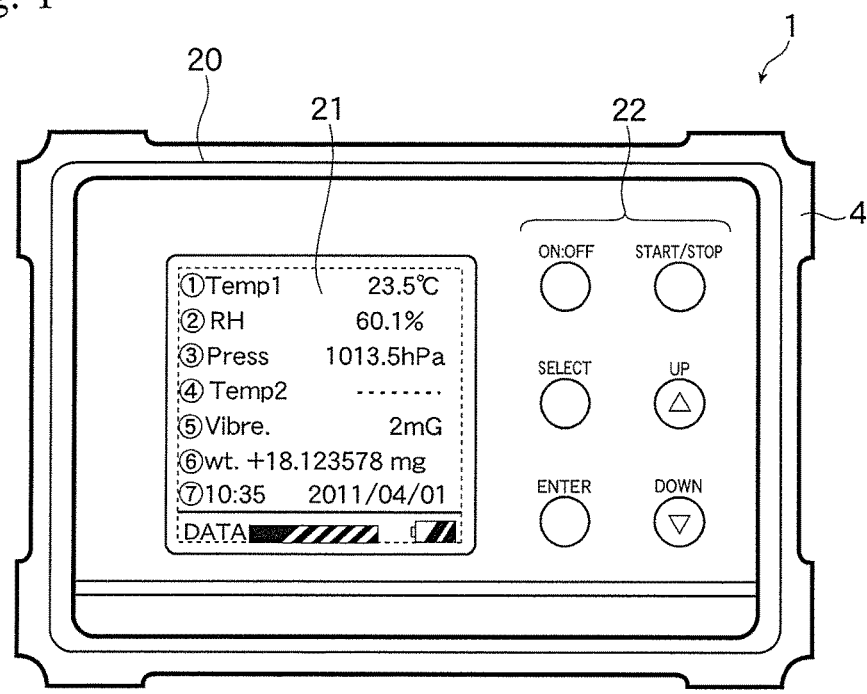
FIG. 1 is a front view of the data logger.
Figure 2:
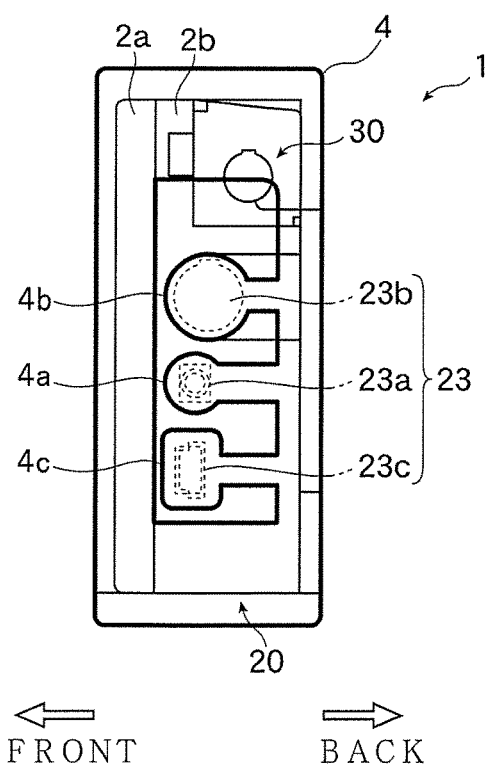
FIG. 2 is a right side view of the data logger.
Figure 3:
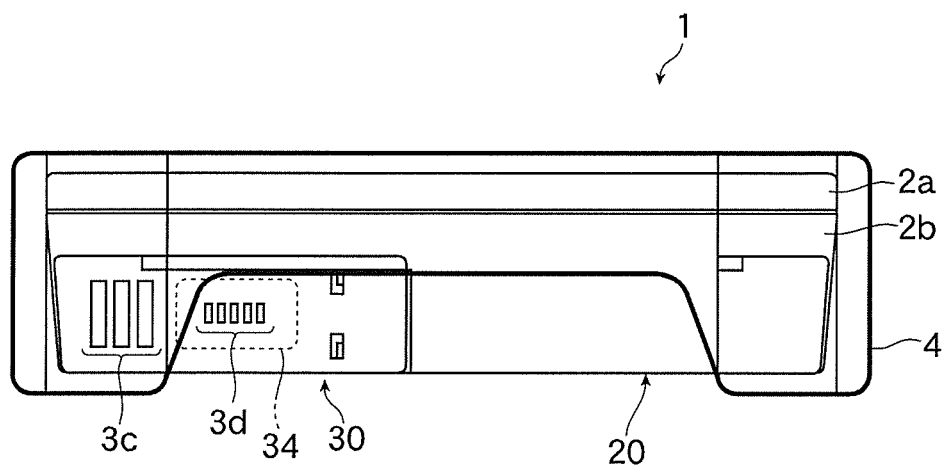
FIG. 3 is a plan view of the data logger, and is a view showing a state in which a temperature/humidity sensor unit is attached.
Figure 4:
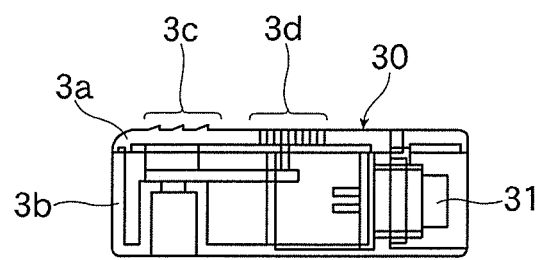
FIG. 4 is a front view of the temperature/humidity sensor unit.
Figure 5:
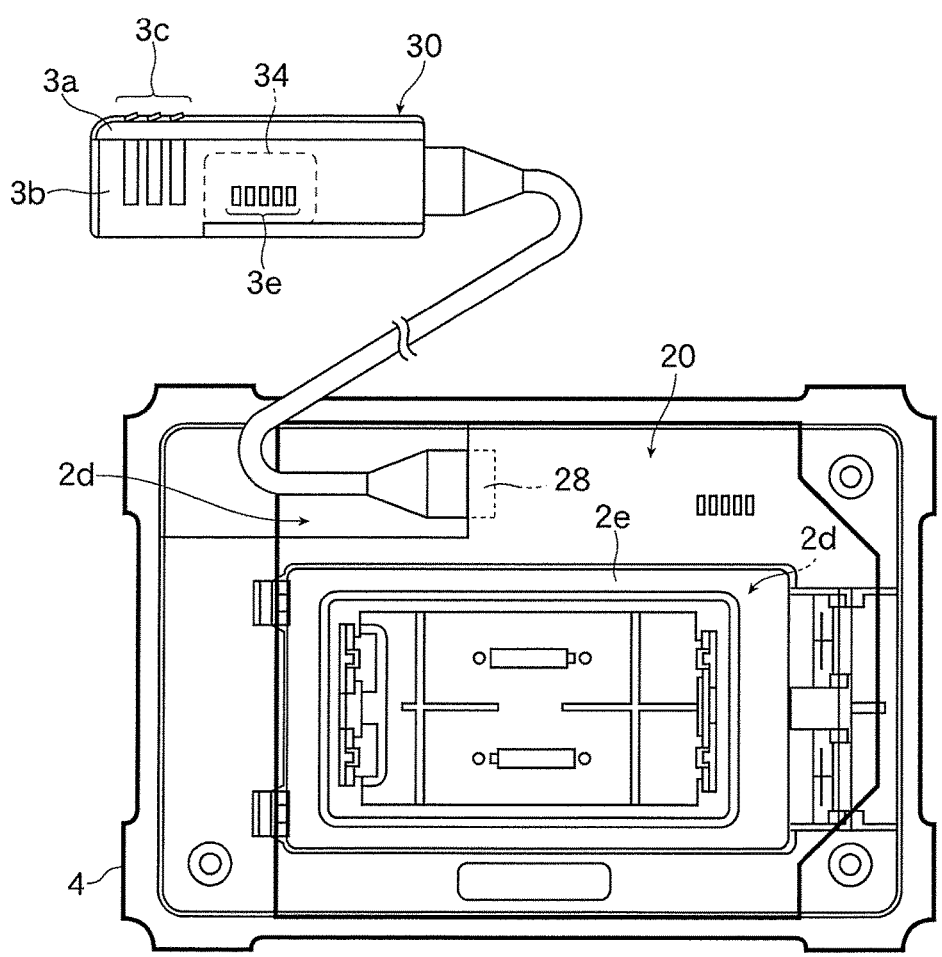
FIG. 5 is a back view of the data logger, and is a view showing a state in which the temperature/humidity sensor unit is detached.
Figure 6:
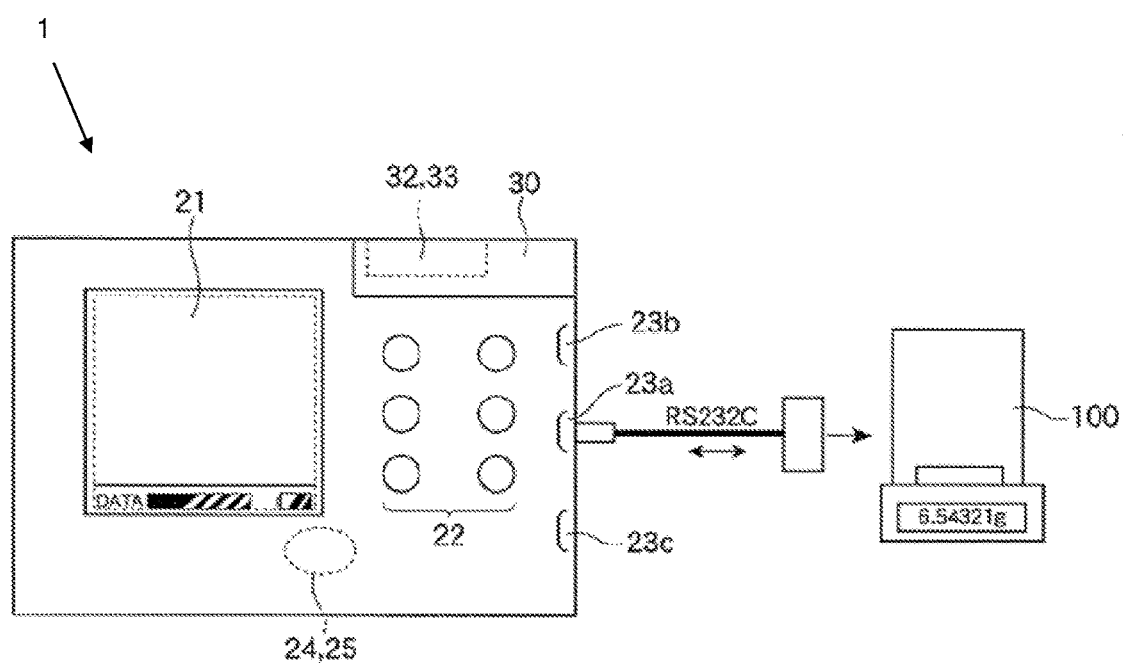
FIG. 6 is a conceptual view showing Usage Example 1 of the data logger.

A configuration of a data logger 1 according to the present invention will be described using FIGS. 1 to 5. FIG. 1 is a front view of the data logger, FIG. 2 is a right side view of the data logger, FIG. 3 is a plan view of the data logger, and is a view showing a state in which a temperature/humidity sensor unit is attached, FIG. 4 is a front view of the temperature/humidity sensor unit, and FIG. 5 is a back view of the data logger, and is a view showing a state in which the temperature/humidity sensor unit is detached. In addition, FIG. 4 shows the transparent interior of a case.

The illustrated data logger 1 for a measurement device is used for a measurement device 100, and consists of a data logger main body 20 and a temperature/humidity sensor unit 30 that can be attached and detached with respect to the data logger main body 20.

The data logger main body 20 is palm sized with 80 mm in length, 120 mm in width, and 30 mm in depth, and is provided at the front surface with a display section 21 and a key operation section 22. Moreover, in a central portion of the right side surface, an external equipment terminal connector group 23 of a measurement device connector 23a for RS232C to receive measurement data from the measurement device 100, an external equipment connector 23b which can communicate with external equipment such as an external water temperature sensor 200, and a USB mass storage device class connector 23c capable of transferring data to a PC is disposed. In a position facing the right side surface, upper surface, and back surface of the data logger main body 20, a temperature/humidity sensor unit housing recess portion 2d that substantially matches the outline of a temperature/humidity sensor unit 30 to be described later is formed. At a right side wall in a back view of the temperature/humidity sensor unit housing recess portion 2d, a temperature/humidity terminal connector 28 connectable with a temperature/humidity data output terminal 31 to be described later is provided.

The data logger main body 20 incorporates an electronic substrate mounted with an air pressure sensor 24, an acceleration sensor 25, and related ICs of these, and which can detect air pressure variations and vibration. Moreover, the electronic substrate is also mounted with a data memory (data recording means) 26 that records, on the basis of time, air pressure and vibration data detected by the built-in sensors 24 and 25, temperature and humidity data detected by the temperature/humidity sensor unit 30 to be described later, and measurement data detected by the external measurement device 100 and taken in via the measurement device connector 23a and a CPU (data processing means) 27 that displays the temperature, humidity, air pressure, and vibration data and the measurement data recorded in the data memory 26, as numerical values or graphs of changes over time, with the time axes aligned.

Figure 18:
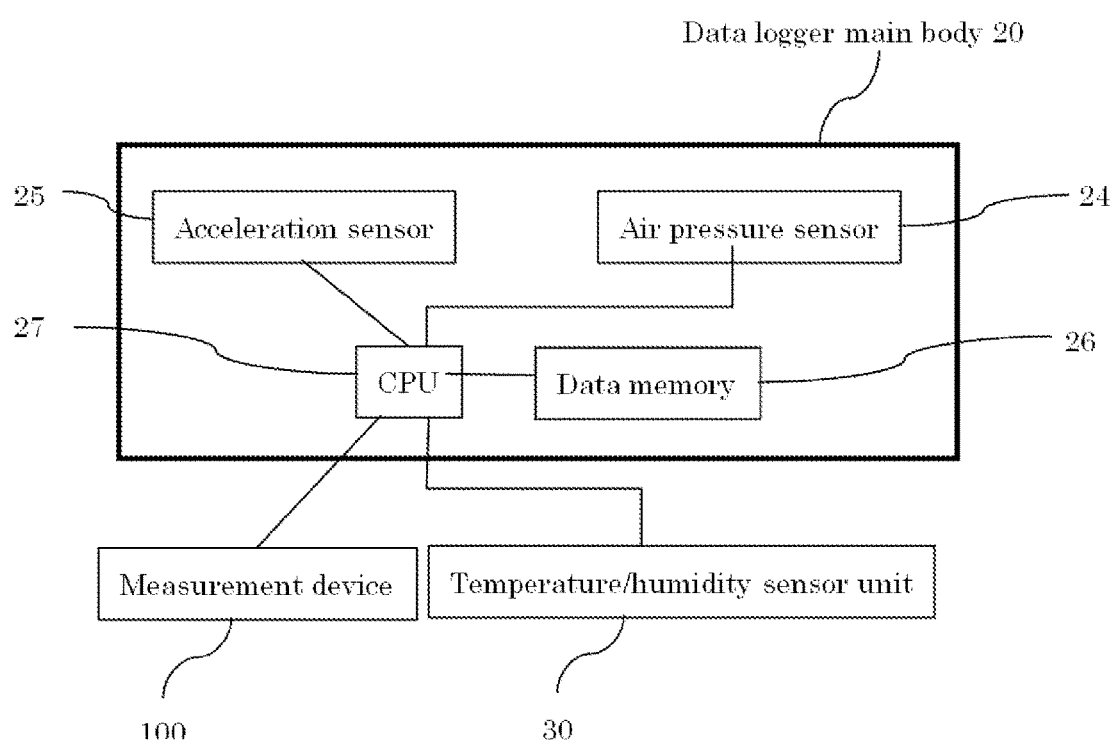
FIG. 18 is a block diagram of the data logger.

The data logger main body 20 includes a front case 2a including the display section 21 and the key operation section 22 and opened rearward and a rear case 2b having the built-in electronic substrate mounted with the air pressure sensor 24, the acceleration sensor 25, the data memory 26, and the CPU 27 and opened forward, and the cases 2a and 2b are closely fitted by fitting engaging pawls extending from the opening portion of the rear case 2b with engaging recess portions provided in the opening portion of the front case 2a with an O-ring interposed in a joint portion between the rear case 2b and the front case 2a, and the data logger main body 20 thus is a structure having a dustproof and waterproof function equivalent to IP65. The external equipment terminal connector group 23 is a dustproof and splashproof structure in a state other than where there is a connector connection, due to attachment of three watertight cap portions 4a, 4b, and 4c integrally molded with a main body protective cover 4 to be described later. Moreover, in a central portion of the back surface of the rear case 2b, there is a cavity portion in which a battery of the data logger 1 is stored, and the battery housed in the battery cavity portion is sealed by a sliding battery lid 2e. FIG. 18 is a block diagram illustrating the relationship between the air pressure sensor 24, acceleration sensor 25, and data memory 26 with the CPU 27 contained with the main body 20, and the measurement device 100 and temperature/humidity sensor unit 30 that are disposed outside of the main body 20.

The temperature/humidity sensor unit 30 is in a rectangular-parallelepiped shape that is 20 mm in length, 50 mm in width, and 20 mm in depth, and in a back view of the data logger 1, is housed in the data logger main body 20 so as to fill up the recess of the temperature/humidity sensor unit housing recess portion 2d in a state covered at its lower surface, back surface, and right side surface with the temperature/humidity sensor unit housing recess portion 2d when attached.

The temperature/humidity sensor unit 30 incorporates an electronic substrate mounted with a temperature sensor 32, a humidity sensor 33, and related ICs of these, and can detect temperature and humidity variations. Moreover, the temperature/humidity sensor unit 30 includes, in a central portion of the right side surface, a temperature/humidity data output terminal 31 connected to the temperature/humidity terminal connector 28 of the data logger main body 20 to send temperature/humidity data to the data logger main body 20.

The temperature/humidity sensor unit 30 includes a lower case 3b having the built-in electronic substrate mounted with the temperature sensor 32 and the humidity sensor 33 and opened upward and an upper case 3a to serve as a lid portion thereof, and the cases 3a and 3b are closely fitted by fitting engaging pawls extending from an opening portion of the upper case 3a with engaging recess portions provided in the opening portion of the lower case 3b with an O-ring interposed in a joint portion between the lower case 3b and the upper case 3a, and the temperature/humidity sensor unit 30 thus is a structure having a dustproof and waterproof function equivalent to IP65. Moreover, the lower case 3b is opened laterally at the right, and the temperature/humidity data output terminal 31 is circumferentially surrounded and protected at a right side end portion of the lower case 3b while being connectable with the temperature/humidity terminal connector 28. Moreover, at a left side of the upper surface of the upper case 3a, sliding pawls 3c that provide excellent finger retention during sliding are formed, and at a central portion of the upper surface of the upper case 3a, a filter-use window portion 3d for a waterproof and moisture-permeable filter 34 to be described later is provided.

By sliding the temperature/humidity sensor unit 30 in the right direction and fitting the temperature/humidity data output terminal 31 by insertion into the temperature/humidity terminal connector 28, the air tightness of the temperature/humidity data output terminal 31 is secured and the temperature/humidity sensor unit 30 reaches an attached state where it is integrated in external appearance with the data logger main body 20. In the attached state, the temperature/humidity sensor unit 30 does not easily contact a person or object and physical damage is also less likely to occur because of being covered with the data logger main body 20 (temperature/humidity sensor unit housing recess portion 2d). Moreover, the temperature/humidity sensor unit 30 is also less likely to be splashed with water drops and a malfunction due to liquid entry is also less likely to occur because of the covering.

On the other hand, by sliding the temperature/humidity sensor unit 30 in the left direction and removing the temperature/humidity data output terminal 31 from the temperature/humidity terminal connector 28 to bring about a cable-connected state between the terminal 31 and the connector 28, the temperature/humidity sensor unit 30 reaches a detached state in which a temperature and humidity environment in another area separated from the data logger main body 20 can be measured.

Moreover, the electronic substrate mounted with the temperature sensor 32, the humidity sensor 33, and ICs for these is horizontally arranged inside the lower case 3b, and over a position to dispose the humidity sensor 33, a filter 34 made of a waterproof and moisture-permeable material is adhered to the inside of the sensor upper case 3a, and a waterproof and moisture-permeable filter 34 is adhered also to the inside of the lower case 3b. Further, only the part of the waterproof and moisture-permeable filters 34 is in contact with external ambient air via the filter-use window portion 3d of the upper case 3a and a filter-use window portion 3e of the lower case 3b, and other parts, that is, the electronic substrate mounted with the temperature sensor 32, the humidity sensor 33, and related ICs of these is prevented from hindering water absorption of a humidity sensing body of the humidity sensor 33 by providing a packing for a fitting portion between the upper case 3a and the lower case 3b, and thus a temperature/humidity sensor unit 30 that has a dustproof and waterproof structure despite including a humidity sensor is provided.

Moreover, among a wide variety of environmental sensors, humidity sensors 33 are particularly poor in durability, but in the data logger 1, because it suffices to replace only the temperature/humidity sensor unit 30 in the case of a malfunction of the humidity sensor 33, maintenance is easy and low cost.

The entire data logger main body 20 is covered at its upper surface and lower surface, circumferentially at its right side surface, circumferentially at its left side surface, circumferentially at its front surface, and circumferentially at its back surface with the main body protective cover 4 (indicated by thick lines in FIGS. 1 to 3 and FIG. 5) which is an integrated molding made of a viscoelastic material having a thickness of approximately 3 mm. Four corner positions of the main body protective cover 4 are extended upward/downward and laterally in trapezoidal shapes, and as a result of the main body protective cover 4 being fitted, the data logger main body 20 has a self-standing capability and has shock resistance strong enough for a fall of the main body from 1.5 m. In a right side surface portion of the main body protective cover 4, for respective connector positions of the measurement device connector 23a, the external equipment connector 23b, and the USB connector 23c, the watertight cap portions 4a, 4b, and 4c molded integrally with the cover 4 are formed by extension from the rearward side toward the forward side of the right side surface portion of the main body protective cover 4. By opening and closing the respective watertight cap portions 4a, 4b, and 4c, a necessary connector (s) of the external equipment terminal connector group 23 can be opened, and other connector (s) can be sealed for protection (dustproofed and splashproofed).

Next, usage examples and function of the data logger 1 will be described.

Usage Example 1 of the data logger 1 will be described using FIGS. 6 to 9. Usage Example 1 is a common usage example of the present data logger 1 in which the data logger 1 is used for an analytical balance that has reading accuracy (minimum display) of a measured value of 0.1 mg or less as the measurement device 100, and the temperature/humidity sensor unit 30 is used in an attached state. In addition, in the drawings in the following usage examples, description of the main body protective cover 4 will be omitted.

Figure 7:
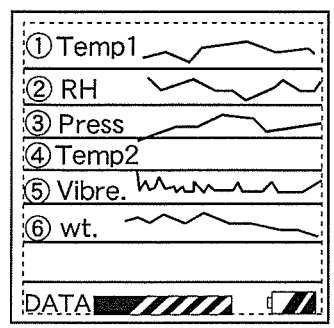
FIG. 7 is a full trend display example of the data logger.
Figure 8:
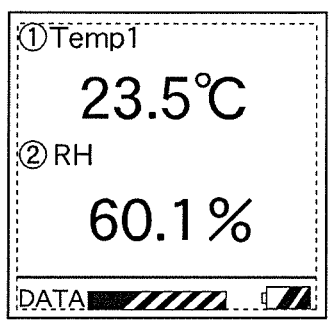
FIG. 8 is a selective numerical display example of the data logger.
Figure 9:
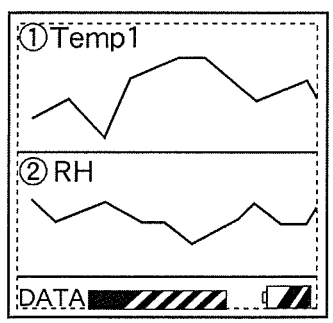
FIG. 9 is a selective trend display example of the data logger.
Figure 10:
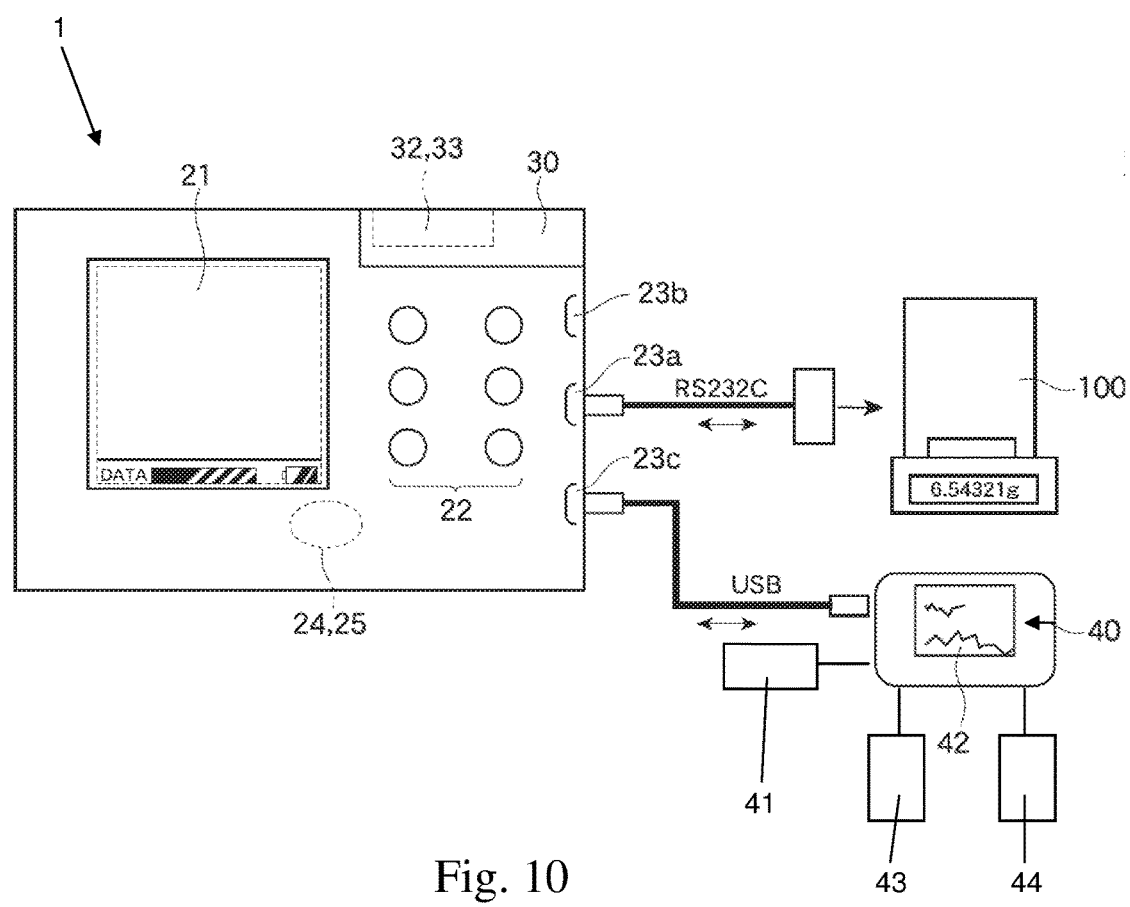
FIG. 10 is a conceptual view showing Usage Example 2 of the data logger.

First, at the site of measurement, an output connector of the target measurement device 100 and the measurement device connector 23a of the data logger 1 are connected by a terminal cable for RS232C for installation. Next, when a measurement is started at the measurement device 100, a zero point being measurement data under no load and a weight being measurement data under load are output from the measurement device 100 to the data logger 1, triggered by a command issued from the measurement device 100, and simultaneously, four types of environmental data detected by the air pressure sensor 24 and the acceleration sensor 25 in the data logger main body 20 and the air pressure sensor 32 and the humidity sensor 33 in the temperature/humidity sensor unit 30 are stored in the data memory 26 together with date/time information. The environmental data of the temperature, humidity, air pressure, and acceleration and the weight measurement data recorded in the data memory 26 are promptly read out to the CPU 27, and are subjected to data processing so as to be numerically displayed (FIG. 1) on the display section 21 in a manner unified in time and correlated with each other. Alternatively, it is also possible to carry out a full trend display consisting of graphs of changes over time of correlation with a time axis set on the horizontal axis and variations of all types of data shown on the vertical axis by an operation of the key operation section 22 (FIG. 7). Alternatively, a selective numerical display (FIG. 8) or selective trend display (FIG. 9) that picks up only data on which a user wishes to focus, for example, only the temperature and humidity can also be performed by an operation of the key operation section 22. In addition, in a trend display, it is possible for a user to carry out automatic scaling to a desired time duration by an operation of the key operation section 22.

The data logger 1 can perform all such processing that is required at the site of measurement of data acquisition, centralized data management, and data processing (numerical display, graphing) in the single equipment without using a general-purpose PC. Accordingly, not only the trouble of using a plurality of various data loggers at the same time and compiling respective data into other equipment is eliminated, but also at the site of measurement, such as areas including a clean room where bringing in PCs is prohibited and areas where general-purpose USB memories cannot be brought in for reasons of security, where data acquisition, centralized data management, and data processing have conventionally been difficult, easy adaptation is enabled.

Next, Usage Example 2 of the data logger 1 will be described using FIGS. 10 to 15. Usage Example 2 includes a measurement analyzer 40 connected to the USB connector 23c in addition to Usage Example 1.

The measurement analyzer 40 is characterized by including in its own structure a measurement data computing and recording means which is connectable with the data logger 1 via an external terminal connector (USB connector 23c) or directly connectable with the measurement device 100, which computes, from measurement data of a zero point and weight read out of the data logger 1 or the measurement device 100, at least a span value and a standard deviation of the span value or a standard deviation of the zero point or weight, and records the same data on the basis of time, a data processing means 43 which displays installation environmental data (temperature, humidity, air pressure, and acceleration) read out from the data logger 1 and the computed measurement data (span value and various standard deviations) computed by the measurement data computing and recording means in whole or selectively, in an identical screen of its own display section 42, as numerical values or graphs of changes overtime, with the time axes aligned, and a data analysis means 44 which analyzes and displays correlations between the above-mentioned installation environmental data and the above-mentioned measurement data and the above-mentioned computed measurement data.

In addition, it is also possible to connect the measurement analyzer 40 with the measurement device connector 23a by a terminal cable for RS232C.

At the site of measurement, besides linking acquired installation environmental data and measurement data (weight) to be graphed, an operation is also performed such as calculating from acquired measurement data (zero point and measurement) indices that allow for grasping the performance of the measurement device, such as a span value being a difference between the zero point being measurement data under no load and the weight being measurement data under load, a standard deviation of the above-mentioned span value determined by repeatedly measuring the above-mentioned load the mass of which is already known a plurality of times, and a standard deviation of the above-mentioned zero point or the above-mentioned weight determined by repeatedly measuring the above-mentioned zero point or the above-mentioned weight, managing these computed measurement data (span value and various standard deviations (repeatabilities)) and the installation environmental data in a centralized manner and subjecting said data to data processing (numerical display, graphing) and correlation analysis.

The measurement analyzer 40 is an exclusive product capable of, inside the single equipment, managing in a centralized manner measurement data (zero point and weight) and installation environmental data acquired from the measurement device 100 or the data logger 1 and also computed measurement data (span value and various standard deviations) calculated by itself and installation environmental data and subjecting said data to data processing (numerical display, graphing) and data analysis (collation analysis without time display).

Figure 11:
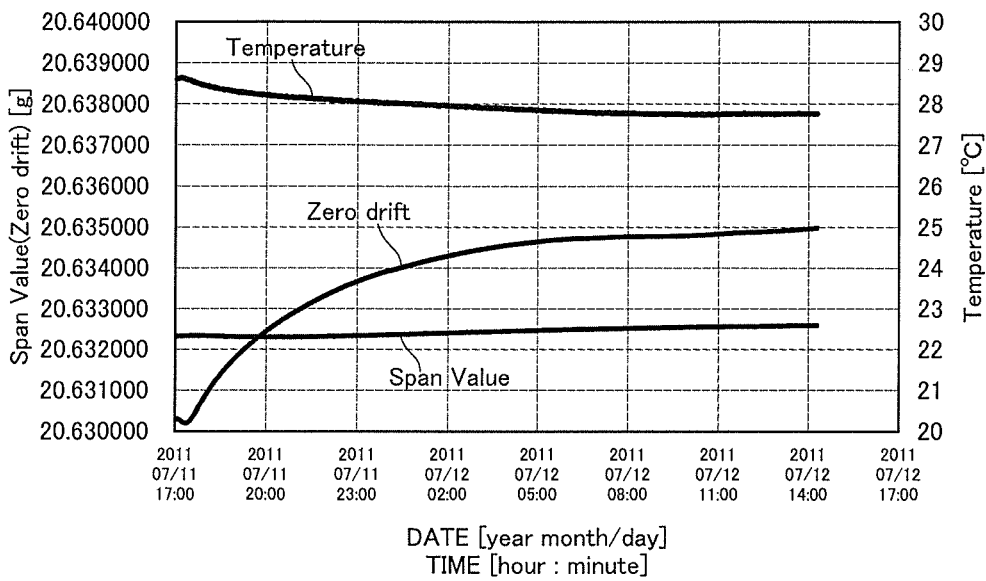
FIG. 11 is Selective Trend Display Example 1 of the analyzer.
Figure 12:
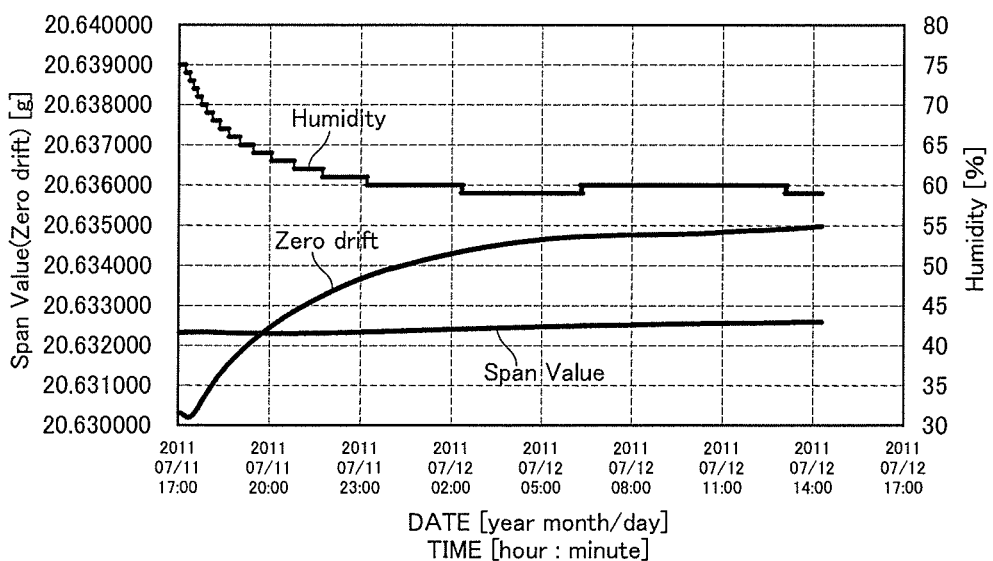
FIG. 12 is Selective Trend Display Example 2 of the analyzer.
Figure 13:
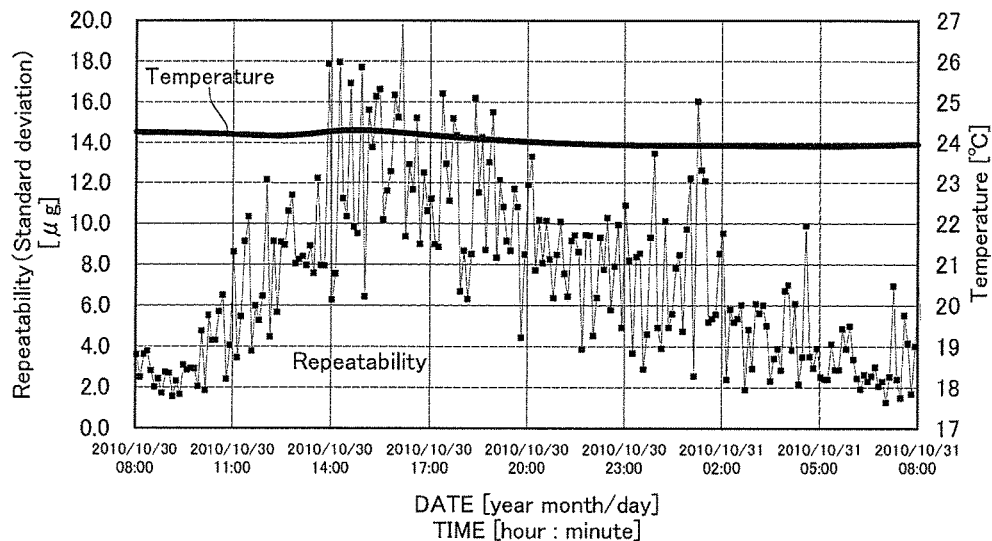
FIG. 13 is Selective Trend Display Example 3 of the analyzer.

Computed measurement data computed and recorded by the measurement data computing and recording means 41 of the measurement analyzer 40 is promptly linked with installation environmental data read out by the data processing means 43, and a display is carried out with automatic scaling on the display section 42, examples of which include, as shown in FIG. 11, a selective trend display consisting of graphs of changes over time of variations correlated with a time axis selected for the horizontal axis and the temperature (right axis), span value (left axis), and zero point (left axis) selected for the vertical axis, and as shown in FIG. 12, a selective trend display consisting of graphs of changes over time of variations correlated with a time axis selected for the horizontal axis and the humidity (right axis), span value (left axis), and zero point (left axis) selected for the vertical axis, and as shown in FIG. 13, a selective trend display consisting of graphs of changes over time of variations correlated with a time axis selected for the horizontal axis and the temperature (right axis) and span value standard deviation (left axis) selected for the vertical axis.

Figure 14:
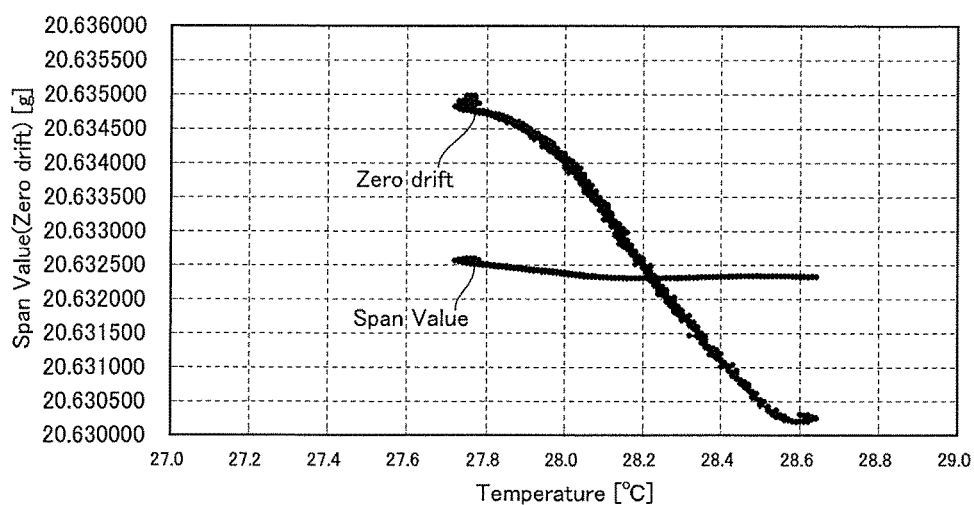
FIG. 14 is Correlation Analysis Example 1 of the analyzer.
Figure 15:
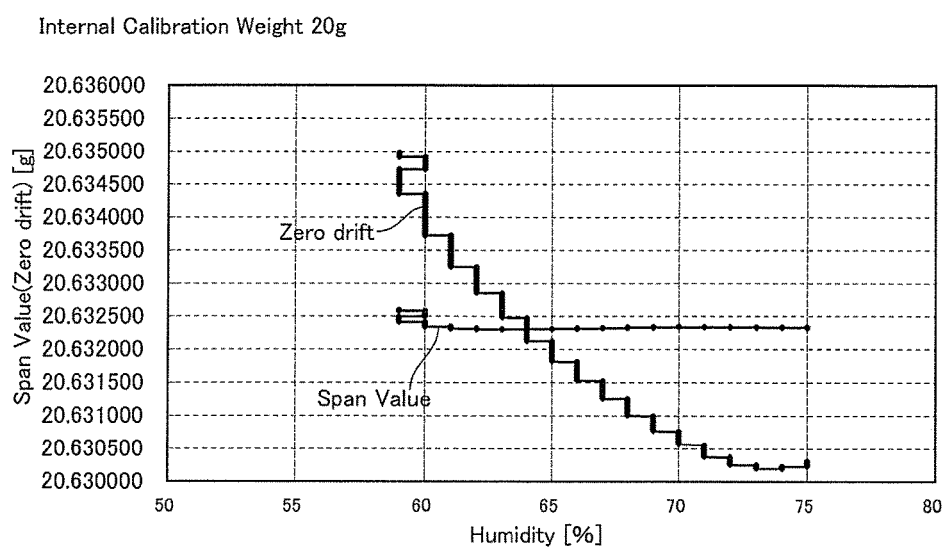
FIG. 15 is Correlation Analysis Example 2 of the analyzer.

Furthermore, a display is carried out by the data analysis means 44 with automatic scaling on the display section 42, such as, as shown in FIG. 14, correlated analysis graphs of the zero point/span value with respect to temperature changes with the temperature displayed on the horizontal axis and the zero point/span value displayed on the vertical axis by eliminating the time axis from the data shown in FIG. 11, and as shown in FIG. 15, correlated analysis graphs of the zero point/span value with respect to humidity changes with the humidity displayed on the horizontal axis and the zero point/span value shown on the vertical axis by eliminating the time axis from the data shown in FIG. 12.

Accordingly, even at the site of measurement such as a clean room, numerical processing of measurement data, centralized management of the data including computed measurement data, graphing, etc., are possible in real time and easily even without installing a PC, so that troublesome work for a user that has conventionally been performed to realize these data processing is eliminated. Further, it can be understood at a glance by a user referring to the correlated analysis graphs of FIG. 14 and FIG. 15 prepared from FIG. 11 and FIG. 12 of a simultaneous measurement that the zero drift is greatly affected by changes in temperature and humidity, and it becomes possible to promptly judge by the user him/herself what degree of environmental setting allows achieving a required measurement accuracy.

Specifically, adding a measurement analyzer 40 to the data logger 1 makes the data logger 1 serve as not only a recording medium but also a tool capable of actively evaluating the environment. That is, having once recognized that, as shown in FIG. 13, the span value standard deviation that was on the order of 3 µg on average at the start of measurement has gradually degraded to 14 µg on average by performing monitoring with the data logger 1 for monitoring while also performing data processing by the measurement analyzer 40 in parallel, a user can perform an operation such as finding out which data of the temperature, humidity, air pressure, and vibration is in the closest conjunction with the span value standard deviation from a trend display. If it is revealed as a result thereof that acceleration data shows conjunction, the user can recognize that the cause is vibration of the building with the passage of a low pressure area, and the user him/herself can appropriately improve the surrounding environment such as installing an anti-vibration platform for the measurement device 100. Consequently, the reliability of the measurement device 100 from the user is further increased.

Figure 16:
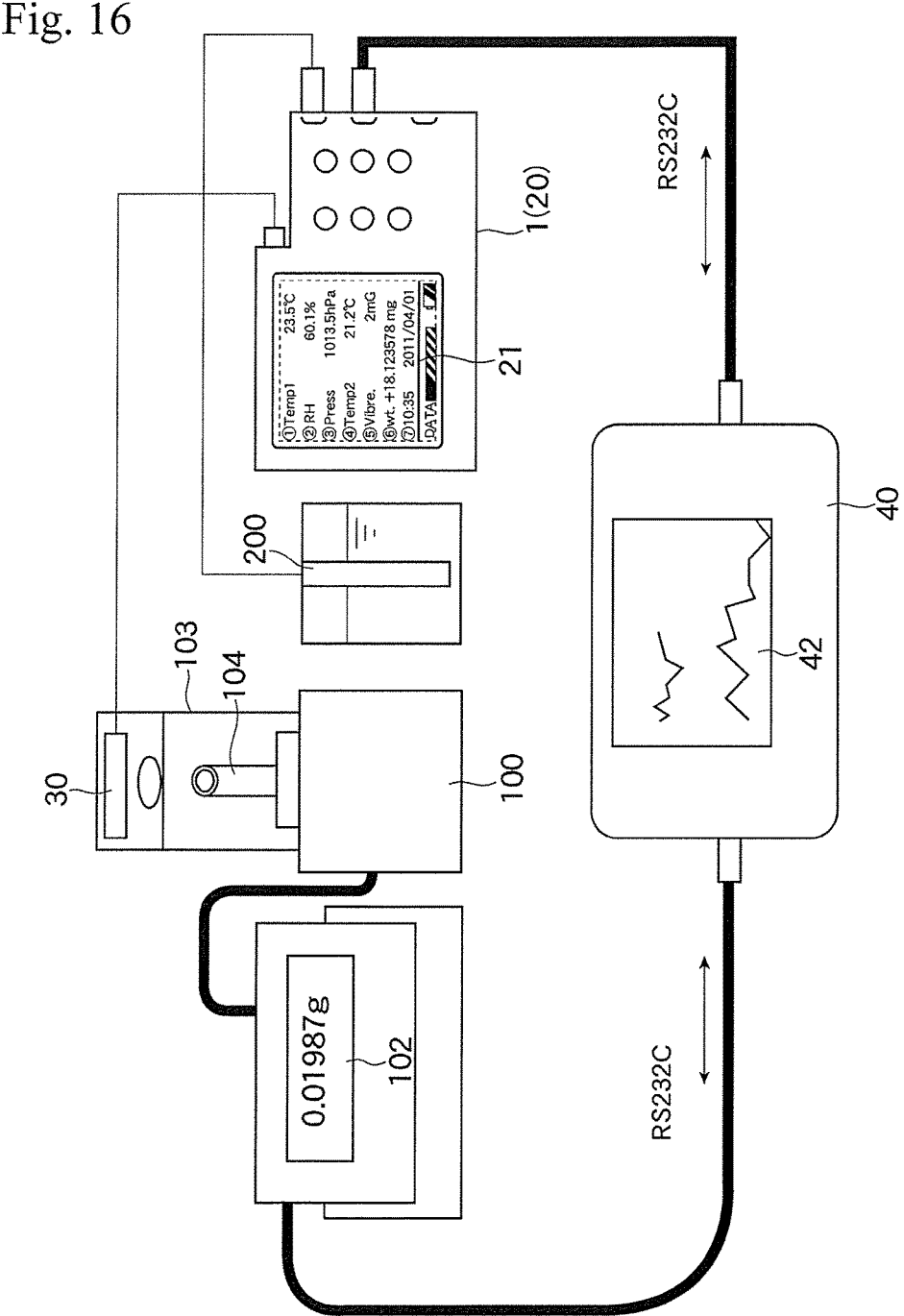
FIG. 16 is a conceptual view showing Usage Example 3 of the data logger.
Figure 17:
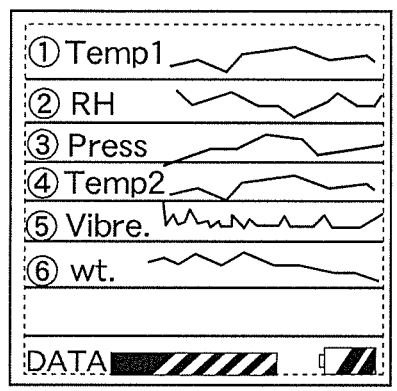
FIG. 17 is a full trend display example of the data logger.

Next, Usage Example 3 of the data logger 1 will be described using FIG. 16 and FIG. 17. Usage Example 3 is an example in which the data logger 1 is used for an analytical balance to be used as the measurement device 100 for a capacity tester to serve mainly for confirmation of the ejection performance of a micropipette, and uses the temperature/humidity sensor unit 30 in a detached state.

To the measurement device connector 23a of the data logger 1, a measurement analyzer 40 is connected by a terminal cable for RS232C, and the measurement analyzer 40 is connected directly to the measurement device 100 via a display section 102 by a terminal cable for RS232C. On the upper surface of the measurement device 100, a measuring vessel 104 is placed at a position over a measuring section, and the measuring vessel 104 is covered at a position other than the measuring section with a humidity retaining vessel 103 to prevent liquid evaporation of a sample in the measurement vessel 104.

Further, the temperature/humidity sensor unit 30 is introduced into the inside of the humidity retaining vessel 103 in a state detached from the data logger main body 20 and extended by a cable. Specifically, in Usage Example 3, the temperature/humidity sensor unit 30 is used as an instrument to measure a temperature and humidity environment in the humidity retaining vessel 103 located at the position separated from the data logger main body 20. Thus, the temperature and humidity environment in the humidity retaining vessel 103 that can be high humidity due to evaporation of the sample can be monitored, and is managed with measurement data (measurement value) in a centralized manner by the data logger 1, and similar to Usage Example 1, displayed numerically (FIG. 16) or as a full trend display (FIG. 17).

Moreover, to the external equipment connector 23b of the data logger 1, an external water temperature sensor 200 is connected. The external water temperature sensor 200 is installed for measuring the temperature of water to serve as a sample in order to correct the density of water at calibration of a micropipette. Water temperature data detected by the external water temperature sensor 200 is stored in the data memory 26 similar to Usage Example 1, and can be displayed numerically or as a full trend display by the CPU 27 (Temp2). In this manner, for the data logger 1, another sensor may be externally connected to the external equipment connector 23b to expand the application of the data logger 1 to meet user specifications.

In addition, the data logger 1 and the measurement analyzer 40 are characterized by being exclusive products capable of centralized data management and data processing even without requiring a PC, but can also transmit data to a PC via the USB connector 23c, and therefore may be used in a system where data processing is performed by a PC.

REFERENCE SIGNS LIST

1 Data logger
3d, 3e Filter-use window portion
4 Main body protective cover
4a, 4b, 4c Watertight cap portion
20 Data logger main body
21 Display section
23 External equipment terminal connector group
23a Measurement device connector
23b External equipment connector
23c USB connector
24 Air pressure sensor
25 Acceleration sensor
26 Data memory
27 CPU
28 Temperature/humidity terminal connector
30 Temperature/humidity sensor unit
31 Temperature/humidity data output terminal
32 Temperature sensor
33 Humidity sensor
34 Waterproof and moisture-permeable filter
40 Measurement analyzer
100 Measurement device
200 External water temperature sensor

The invention claimed is:

1. A data logger to be used for a measurement device that measures a mass of an object, comprising:
a data logger main body including a main body case;
a temperature sensor;
a humidity sensor; and
an air pressure sensor and an acceleration sensor, the sensors serving as an environmental sensor that detects a physical quality of an environment where the measurement device is installed, wherein
the humidity sensor and the temperature sensor are configured as a temperature/humidity sensor unit that includes a sensor case formed in a rectangular-parallelepiped shape and attachable to and detachable from the data logger main body that incorporates the air pressure sensor and the acceleration sensor, a data memory, and a CPU, and the temperature/humidity sensor unit includes a temperature/humidity data output terminal to transmit data to the data logger main body,
the data logger main body case comprises a temperature/humidity terminal connector connectable with the temperature/humidity data output terminal; and a temperature/humidity sensor unit housing recess portion that is substantially complementary in shape to the sensor case of the temperature/humidity sensor unit so as to receive and store the sensor case,
wherein the temperature/humidity sensor unit is integrated in external appearance with the data logger main body by connecting the temperature/humidity data output terminal to the temperature/humidity terminal connector.

2. The data logger for a measurement device according to claim 1, wherein the sensor case of the temperature/humidity sensor unit is formed with an upper case and a lower case, the upper case and the lower case are closely fitted with an O-ring interposed between the lower case and the upper case,
an electronic substrate mounted with the temperature sensor and the humidity sensor is horizontally arranged inside the lower case,
at least one filter made of a dustproof and waterproof but vapor-permeable material is disposed over the humidity sensor,
a filter-use window portion is formed on at least either one of the upper case or the lower case,
the filter is exposed to external ambient air via the filter-use window portion,
so that the sensor case of the temperature/humidity sensor unit seals the temperature/humidity sensor from dust and liquid water but not water vapor.

3. The data logger for a measurement device according to claim 1, wherein the data memory records installation environmental data detected by the sensors and measurement data detected by the measurement device on the basis of time; and
the CPU displays the recorded installation environmental data and measurement data in whole or selectively, as numerical values or graphs of changes over time, with time axes aligned, and
the data logger comprises one or more external equipment terminal connectors that exchange signals with the measurement device, and a watertight cap to seal its a connector part of the external equipment terminal connectors is attached at the external equipment terminal connector.

* * * * *